(12) United States Patent
Sändig et al.

(10) Patent No.: US 10,823,550 B2
(45) Date of Patent: Nov. 3, 2020

(54) OPTICAL POSITION MEASURING DEVICE

(71) Applicant: DR. JOHANNES HEIDENHAIN GmbH, Traunreut (DE)

(72) Inventors: Karsten Sändig, Palling (DE); Walter Huber, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 16/522,037

(22) Filed: Jul. 25, 2019

(65) Prior Publication Data

US 2020/0041252 A1  Feb. 6, 2020

(30) Foreign Application Priority Data

Jul. 31, 2018  (DE) .................. 10 2018 212 719

(51) Int. Cl.
*G01B 11/14* (2006.01)
*G01B 9/02* (2006.01)

(52) U.S. Cl.
CPC ............ *G01B 11/14* (2013.01); *G01B 9/0201* (2013.01)

(58) Field of Classification Search
CPC ......... G01B 11/14; G01B 11/02; G01B 11/00; G01B 9/0201; G01D 5/38; G01D 5/34736
See application file for complete search history.

(56) References Cited

U.S. PATENT DOCUMENTS

| 4,776,701 | A | 10/1988 | Pettigrew | |
|---|---|---|---|---|
| 9,739,598 | B2 | 8/2017 | Joerger et al. | |
| 2008/0062432 | A1* | 3/2008 | Sandig | G01D 5/38 356/499 |
| 2009/0195792 | A1* | 8/2009 | Hermann | G01D 5/38 356/622 |

FOREIGN PATENT DOCUMENTS

| DE | 102008007319 A1 | 8/2009 |
|---|---|---|
| DE | 102013206693 A1 | 10/2014 |
| EP | 0163362 A1 | 12/1985 |
| EP | 1901041 A2 | 3/2008 |
| EP | 2765394 A2 | 8/2014 |

OTHER PUBLICATIONS

European Search Report issued to corresponding EP Application No. 19186786 from the European Patent Office dated Nov. 19, 2019.

\* cited by examiner

*Primary Examiner* — Jonathan M Hansen
(74) *Attorney, Agent, or Firm* — Carter, DeLuca & Farrell LLP (57) ABSTRACT

In an optical position measuring device for the interferential determination of the relative distance of two objects which are movable relative to each other in at least one measuring direction, a bundle of rays emitted by a light source is split up into at least two partial bundles of rays, which fall on a grating or a plurality of gratings on separate optical paths and undergo distance-dependent phase shifts as a result. The partial bundles of rays are superpositioned at a mixing grating, whereupon at least three pairs of interfering partial bundles of rays propagate in different directions in space. Via the mixing grating, each pair of interfering partial bundles of rays is focused on a detector element so that at least three position-dependent, phase-shifted incremental signals are detectable via the detector elements.

11 Claims, 6 Drawing Sheets

OPTICAL POSITION MEASURING DEVICE

CROSS-REFERENCE TO RELATED APPLICATIONS

The present application claims priority to Application No. 10 2018 212 719.0, filed in the Federal Republic of Germany on Jul. 31, 2018, which is expressly incorporated herein in its entirety by reference thereto.

FIELD OF THE INVENTION

The present invention relates to an optical position measuring device, which is suitable for the highly precise determination of the relative position of two objects that are movable relative to each other.

BACKGROUND INFORMATION

Certain conventional optical position measuring devices, referred to as 3-grating measuring systems, are intended for the interferential determination of the relative distance of two objects which are movable relative to each other along at least one measuring direction. In the process, the partial bundles of rays, which are split up from a bundle of rays emitted by a light source, pass through separate optical paths and fall on a grating or a plurality of gratings. The partial bundles of rays undergo distance-dependent phase shifts before they are brought to an interferential superposition on a recombination element. Following a new superposition, at least three pairs of interfering partial bundles of rays then propagate in different directions in space and are focused on an individual detector element with the aid of a focusing element in each case, so that at least three position-dependent, phase-shifted incremental signals are able to be detected via the detector elements.

In such position measuring devices, the grating most recently passed through in the scanning optical path acts as the recombination element. This grating is frequently arranged as a linear transmission phase grating featuring a constant spatial frequency. Via the recombination element, an adjustment of the desired phase shifts or phase relations between the diffraction orders that interfere with each other in a pairwise manner is made, for which purpose the grating parameters such as grating period and phase depth of the transmission phase grating are normally selected accordingly. In this context, reference is made to, for example, European Published Patent Application No. 163 362. For example, through the use of appropriate grating parameters, it is possible to generate incremental signals that are phase-shifted by 120° in each case on three detector elements, the signals being based on partial bundles of rays, interfering in a pairwise manner, in a $0^{th}/-2^{nd}$ diffraction order, a $+1^{st}/-1^{st}$ diffraction order as well as a $0^{th}/+2^{nd}$ diffraction order.

The pairs of partial bundles of rays propagating in the direction of the detector elements usually have diameters of several millimeters. In conjunction with the selected grating period of the recombination element, this often leads to a distance between the recombination element and the detector elements that would result in an exceeding of the tolerable size of the corresponding position measuring device. In addition, it must be kept in mind that the light-sensitive surface of the individual detector elements must have a certain minimum size. However, this is considered disadvantageous in view of the resulting capacities in the detector elements, and thus in view of the limit frequency of the position measuring device. In an effort to ensure a compact size of the position measuring device on the one hand, and to allow for the smallest possible configuration of the light-sensitive surface of the detector elements on the other hand, a focusing element is therefore often placed downstream from the recombination element in such position measuring devices, in whose image-side focal plane the detector elements are situated. As a rule, the focusing element is arranged as a refractive lens, which requires a certain amount of space; in this regard as well, reference is made to European Published Patent Application No. 163 362, referred to above.

The described position measuring devices may be used both for detecting lateral relative movements in the form of a relative linear shift or rotation of two objects that are movable in relation to each other, as provided for in European Published Patent Application No. 163 362, for example. However, it is also possible that such a measuring principle is used for the detection of relative movements along a vertical direction, as described, for example, in German Published Patent Application No. 10 2013 206 693.

It is considered disadvantageous in both applications if the required focusing element in the corresponding position measuring devices requires excessive space and/or if too many individual components have to be calibrated relative to one another during the assembly.

SUMMARY

Example embodiments of the present invention provide an optical position measuring device having a compact configuration and requiring a low possible outlay in terms of time and effort during the calibration of the various components.

According to an example embodiment of the present invention, an optical position measuring device may be used for the interferential determination of the relative distance of two objects that are movable relative to each other along at least one measuring direction. In the process, a bundle of rays emitted by a light source is split up into at least two partial bundles of rays, which then fall on a grating or a plurality of gratings on separate optical paths and undergo distance-dependent phase shifts in the process. The partial bundles of rays are superpositioned at a mixing grating, whereupon at least three pairs of interfering partial bundles of rays propagate in different directions in space, and the focusing of each pair with interfering partial bundles of rays on a detector element then takes place via the mixing grating, so that at least three position-dependent, phase-shifted incremental signals are detectable via the detector elements.

It may be provided that two partial bundles of rays incident on the mixing grating undergo at least one diffraction of the $0^{th}$, $+/-1^{st}$ and $+/-2^{nd}$ diffraction order, and pairwise interfering partial bundles of rays of the $0^{th}/-2^{nd}$ diffraction order, $+1^{st}/-1^{st}$ diffraction order and the $0^{th}/+2^{nd}$ diffraction order are propagating in the direction of the detector elements.

It is possible that the mixing grating is arranged as a multi-step transmission phase grating.

The mixing grating may be arranged as an n-step transmission phase grating, which has a phase function $\varphi(x, y)$ according to the relationship:

$$\varphi(x, y) = \frac{2\pi}{n} \text{Round}\left(\frac{n * \text{atan2}(\text{Im}(T(x, y)), \text{Re}(T(x, y)))}{2\pi}\right)$$

in which φ(x, y) represents the phase function of the transmission phase grating, x and y represent the spatial coordinates in the plane of the transmission phase grating, n (:=2, 3, 4, . . . ) represents the number of steps of the transmission phase grating, and T(x, y) represents the transmission function of the mixing grating.

In the case of a mixing grating that is arranged as an n-step transmission phase grating, the following relationship may apply with regard to its step height (h):

$$h = \lambda / (n \cdot (n1 - n2))$$

in which h represents the step height, λ represents the wavelength of the light, n:=2, 3, 4, . . . , n1 represents the refractive index of the grating bars, and n2 represents the refractive index of the grating gaps.

According to example embodiments, it may be provided that:
  one of the two objects is connected to a flat measuring reflector;
  the other object is connected to a scanning unit and is situated so as to be movable relative to the measuring reflector along a measuring direction (z), the measuring direction (z) having an orthogonal orientation with respect to the measuring reflector; and
  the scanning unit includes the following components:
    at least one light source;
    a plurality of detector elements;
    the mixing grating;
    a plurality of deflection elements, each being arranged as a one-dimensional reflection grating; and
    at least one splitter element, which is arranged as a one-dimensional transmission grating in each case.

The scanning unit may have a transparent carrier body which includes a cross-section in the form of a truncated pyramid on whose surface facing the measuring reflector the splitter element is situated and on whose side surfaces the at least four deflection elements are situated.

Moreover, the different components in this example embodiment may be arranged such that:
  the bundle of rays emitted by the light source is split up into two partial bundles of rays at the splitter element and the two partial bundles of rays propagate in the direction of the measuring deflector;
  from the measuring reflector, the partial bundles of rays are reflected back in the direction of the first and second deflection elements in the scanning unit, where a deflection of the partial bundles of rays in the direction of the third and fourth deflection elements results;
  via the third and fourth deflection elements, the partial bundles of rays are reflected back to the measuring reflector; and
  from where a back-reflection of the partial bundles of rays results in the direction of the mixing grating in the scanning unit, where a superposition of the partial bundles of rays occurs, whereupon three pairs of interfering partial bundles of rays are focused on three detector elements in different directions in space.

According to example embodiments, it may be provided that:
  one of the two objects is connected to a measuring standard;
  the other object is connected to a scanning unit and is situated so as to be movable relative to the measuring standard along a measuring direction (x), the measuring direction (x) being oriented in parallel with respect to the measuring-standard plane; and
  the scanning unit includes the following components:
    at least one light source;
    a plurality of detector elements;
    the mixing grating; and
    a plurality of scanning gratings, each being arranged as a one-dimensional transmission grating.

It is possible that the scanning unit additionally includes a transparent scanning plate on whose upper and/or lower side the mixing grating and/or the scanning gratings is/are situated.

In addition, a reflector element or a plurality of reflector elements may be situated on the upper side of the scanning plate, whose reflective side is oriented in the direction of the measuring standard and on whose underside the mixing grating as well as the scanning gratings are situated in each case.

According to example embodiments of the present invention, a mixing grating is provided in the scanning optical path which combines the phase-shifting properties of the recombination element with the imaging characteristics of the focusing element. In contrast to the conventional devices featuring the two required components, i.e., a recombination element and a focusing element, only a single component in the form of a diffractive component is provided by the mixing grating in the position measuring device described herein. In this manner, the size of the corresponding measuring device may be reduced and the number of components may be kept to a minimum, while a simplified calibration of the required optical components is also able to be obtained. Apart from a cost reduction, the lower number of components thus also allows for a smaller mass of the corresponding position measuring device.

In addition, the mixing grating used in the device described herein allows for an optimized adaptation of the required optical characteristics to the respective scanning operation; for example, the desired focal position in the detection plane is thereby able to be properly adjusted via the choice of a suitable focal length of the mixing grating.

The position measuring device may be used for detecting lateral relative movements of two movable objects which, for example, are disposed so as to be displaceable or rotatable relative to each other. Moreover, with the aid of the position measuring device, the detection of relative movements of two objects along a vertical direction is possible as well.

Further features and aspects of example embodiments of the present invention are described in more detail below with reference to the appended Figures.

DETAILED DESCRIPTION

Figure 1A:
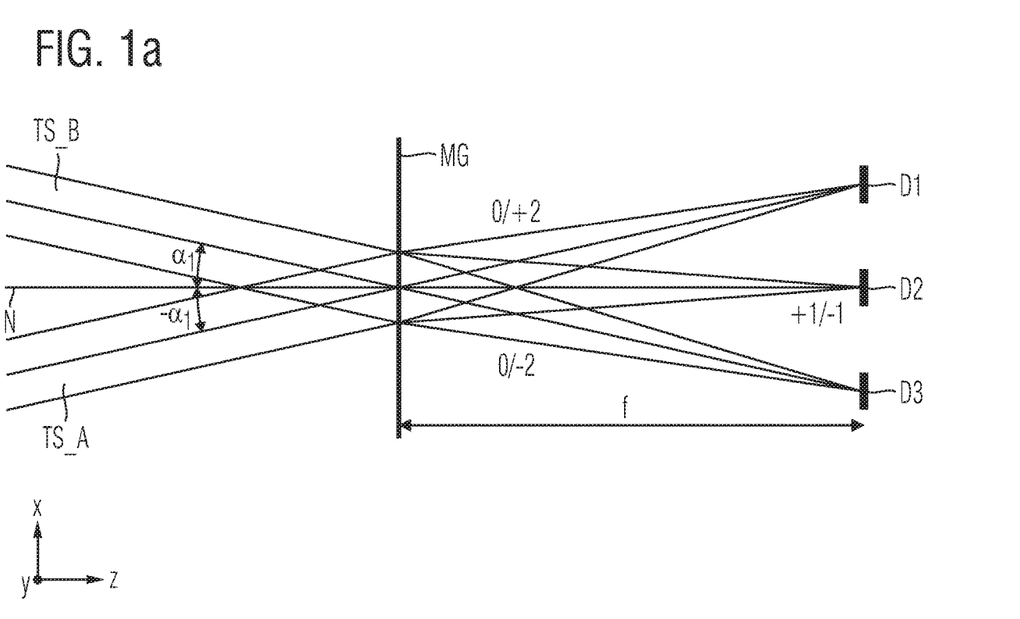
FIG. 1a schematically illustrates optical paths in the area of the mixing grating and the detector elements of a position measuring device according to an example embodiment of the present invention, in the x-z plane.
Figure 1B:
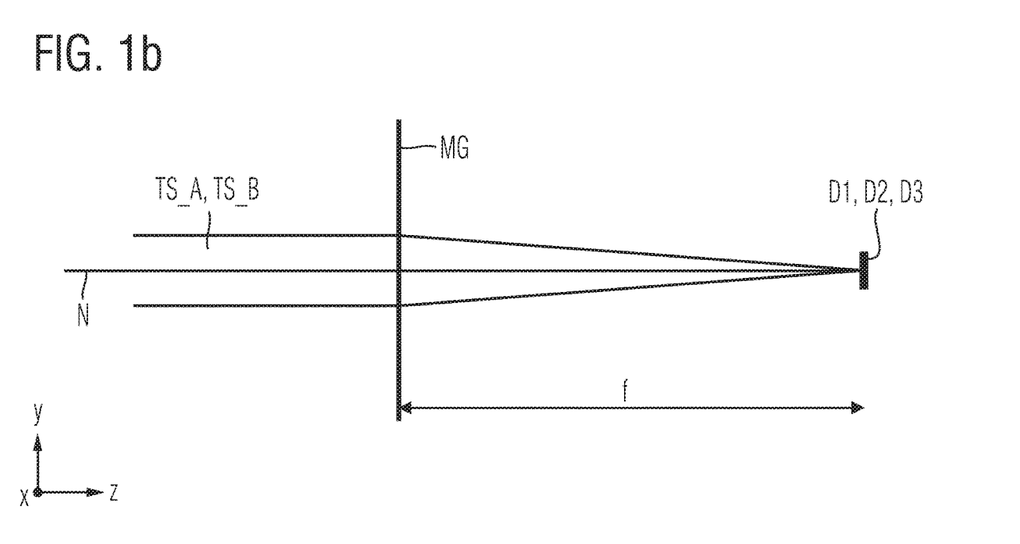
FIG. 1b schematically illustrates the optical paths in the area of the mixing grating and the detector elements of a position measuring device according to an example embodiment of the present invention, in the y-z plane.
Figure 2A:
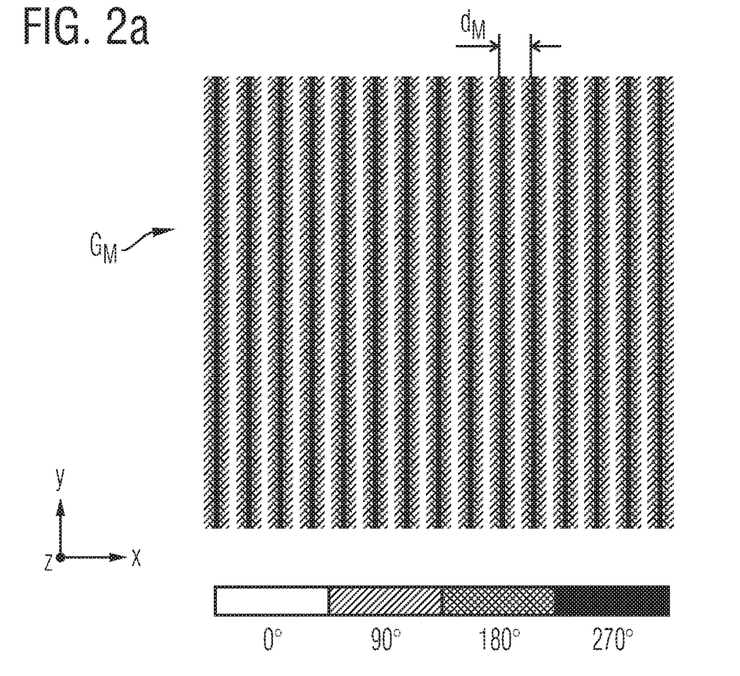
FIG. 2a is a schematic plan view of a multi-step, linear transmission phase grating for the adjustment of defined phase shifts between diffraction orders interfering in a pairwise manner.

Before a number of example embodiments of an optical position measuring device that are suitable for interferential determination of the relative distance of two objects are described with reference to FIGS. 3, 4a, 4b, 5a and 5b, different considerations with regard to the mixing grating that is used in these devices are first outlined with reference to FIGS. 1a, 1b, and 2a to 2d. FIGS. 1a and 1b illustrated in different sectional planes only the relevant optical paths of partial bundles of rays TS_A, TS_B in the region of mixing grating MG, and a plurality of detector elements D1, D2, D3. FIGS. 2a and 2d will be referred to in describing mixing grating MG in greater detail.

In FIGS. 1a, 1b, and 2a to 2d, the direction denoted by z is used as the measuring direction. Two objects, which are connected to different components of the position measuring device, are able to be moved relative to each other along at least this direction. For example, the movable objects may be machine components whose relative position is to be determined. It is possible, for instance, that a scanning unit of the position measuring device is connected to one of the two objects. The scanning unit includes different components, such as a light source, a plurality of detector elements, and a grating or a plurality of gratings having different functions. A measuring reflector or a measuring standard of the position measuring device is connected to the other object. The position-dependent and phase-shifted incremental signals generated with the aid of the position measuring device are able to be further processed by a machine control, for example, in order to control the positioning of the corresponding machine components.

According to example embodiments of the present invention, certain optical functionalities that were previously implemented in separate components of the optical position measuring device are combined in a single mixing grating MG, which is arranged as a diffractive component. This means that according to example embodiments of the present invention, the phase-shifting effects of a recombination element and the focusing effect of a focusing element on the partial bundles of rays TS_A, TS_B are combined in mixing grating MG. As described in greater detail below, mixing grating MG, which is schematically illustrated in FIGS. 1a and 1b, is arranged, for example, as a multi-step transmission phase grating.

The arrangement of a suitable mixing grating MG is described with reference to FIGS. 1a and 1b in the case of a symmetrical incidence of the two partial bundles of rays TS_A, TS_B. After passing through the scanning optical path, the two partial bundles of rays TS_A, TS_B are incident on mixing grating MG under angles of incidence $+/-\alpha_1$ in relation to normal N; for the sake of simplicity, only angles of incidence $+/-\alpha$ that are identical in terms of their amounts are mentioned in the following text. In addition, it is assumed that the $+1^{st}$ diffraction order of partial bundle of rays TS_A resulting at mixing grating MG and the $-1^{st}$ diffraction order of partial bundle of rays TS_B exit perpendicularly from mixing grating MG in each case and then continue propagating, mutually superpositioned, in the direction of centrally disposed detector element D2. In addition, the $0^{th}$ diffraction order of partial bundle of rays TS_A and the $+2^{nd}$ diffraction order of partial bundle of rays TS_B, superpositioned to each other, propagate to detector element D1. The $0^{th}$ diffraction order of partial bundle of rays TS_B and the $-2^{nd}$ diffraction order of partial bundle of rays TS_A, superpositioned to one another, propagate to detector element D3. Mixing grating MG therefore delivers in transmission at least a $0^{th}$ diffraction order as well as $+/-1^{st}$ and $+/-2^{nd}$ diffraction orders of partial bundles of rays TS_A, TS_B incident thereon.

In the case of such a superposition of the different diffraction orders, a grating $G_M$ used for this purpose must then have a grating period $d_M$, for which the following applies:

$$d_M = \frac{\lambda}{\sin\alpha} \qquad \text{(Eq. 1)}$$

in which $d_M$ represents the grating period of a grating $G_M$, which supplies the $0^{th}$ as well as $+/-1^{st}$ and $+/-2^{nd}$ diffraction orders, $\lambda$ represents the wavelength of the light, and $\alpha$ represents the angle of incidence of the partial bundles of rays that are incident on grating $G_M$.

A corresponding linear grating $G_M$, arranged as a four-step transmission phase grating that has a grating period $d_M$, is is schematically illustrated in FIG. 2a. Per grating period $d_M$, four grating regions disposed consecutively in the x-direction are provided, in which the partial bundles of rays passing through undergo a different phase offset in each case; the four phase-shifted grating regions are illustrated in different forms according to the associated legend provided in FIG. 2a.

Taking the desired phase relations of the resulting incremental signals into account, for example, in the form of a relative phase difference of approximately 120° in the case of three incremental signals, the following relationship results for the complex transmission function $T_M(x)$ of grating $G_M$:

$$T_M(x) = 1 + e^{2\pi i\left(\frac{x}{d_M}+\frac{1}{3}\right)} + e^{-2\pi i\left(\frac{x}{d_M}-\frac{1}{3}\right)} + e^{4\pi i\left(\frac{x}{d_M}+\frac{1}{3}\right)} + e^{-4\pi i\left(\frac{x}{d_M}-\frac{1}{3}\right)} \qquad \text{(Eq. 2)}$$

in which $T_M(x)$ represents the complex transmission function of grating $G_M$, x represents the spatial coordinate, and $d_M$ represents the grating period of grating $G_M$.

In order to obtain the required transmission function T(x, y) of actual mixing grating MG with the desired focusing functionality, the complex transmission function $T_M(x)$ of grating $G_M$ has to be multiplied by the lens-transmission function $T_L(x, y)$ of a suitably focusing additional grating $G_L$. Lens transmission function $T_L(x, y)$ of such a focusing grating $G_L$ is obtained according to the following relationship:

$$T_L(x, y) = e^{-\frac{2\pi i \sqrt{x^2+y^2+f^2}}{\lambda}} \quad \text{(Eq. 3)}$$

in which $T_L(x, y)$ represents the lens transmission function of focusing grating $G_L$, x and y represent the spatial coordinates in the focal plane, and $\lambda$ represents the wavelength of the light.

Figure 2B:
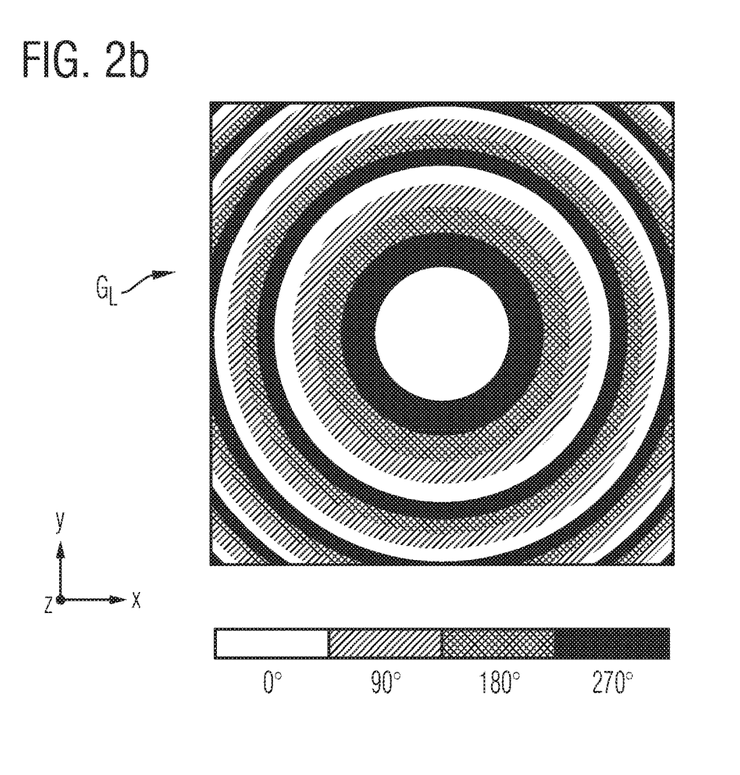
FIG. 2b is a schematic plan view of a multi-step, axially symmetrical transmission phase grating having a focusing effect.

A corresponding axially symmetrical grating $G_L$ providing the required focusing characteristics is illustrated in FIG. 2b in a schematic plan view. In this particular example, grating $G_L$ is also arranged as a four-step transmission phase grating. This means that four consecutively arranged grating regions are provided per grating period in the radial direction, in which the partial bundles of rays passing through undergo a different phase shift in each case. The four phase-shifted grating regions are illustrated in different forms according to the associated legend illustrated in FIG. 2b.

The required transmission function $T(x, y)$ of mixing grating MG, which combines the optical characteristics of the two gratings $G_M$ and $G_L$, then results according to the following relationship:

$$T(x,y) = T_M(x) \cdot T_L(x,y) \quad \text{(Eq. 4)}$$

in which $T(x, y)$ represents the transmission function of mixing grating MG, $T_M(x)$ represents the complex transmission function of grating $G_M$, and $T_L(x, y)$ represents the lens-transmission function of grating $G_L$.

According to Equation 4, mixing grating MG has a structure that has an amplitude- and phase-modulating effect on the incident partial bundles of rays. In order to reduce the production expense, a mixing grating MG having the required optical characteristics may be approximated by an n-step phase grating having a phase function p(x, y) according to the following Equation 5:

$$\varphi(x, y) = \frac{2\pi}{n} \text{Round}\left(\frac{n * \text{atan2}(\text{Im}(T(x, y)), \text{Re}(T(x, y)))}{2\pi}\right) \quad \text{(Eq. 5)}$$

in which $\varphi(x, y)$ represents the phase function of mixing grating MG, n represents the number of the different phase grating steps (a whole number), and $T(x, y)$ represents the transmission function of mixing grating MG.

Figure 2C:
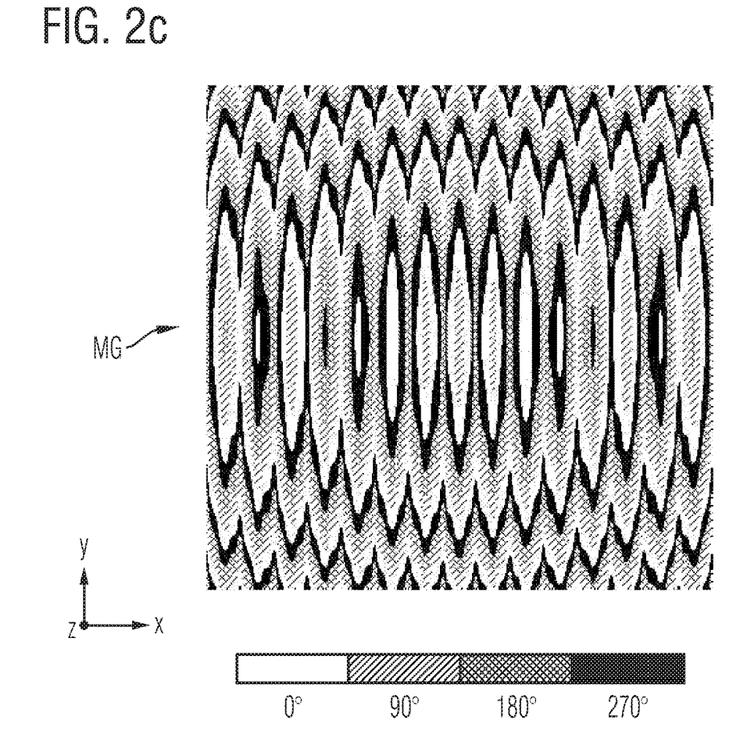
FIG. 2c is a schematic plan view of a suitable mixing grating for a position measuring device according to an example embodiment of the present invention, arranged as a multi-step transmission phase grating, resulting from the superposition of the transmission phase gratings illustrated in FIGS. 2a and 2b.
Figure 2D:
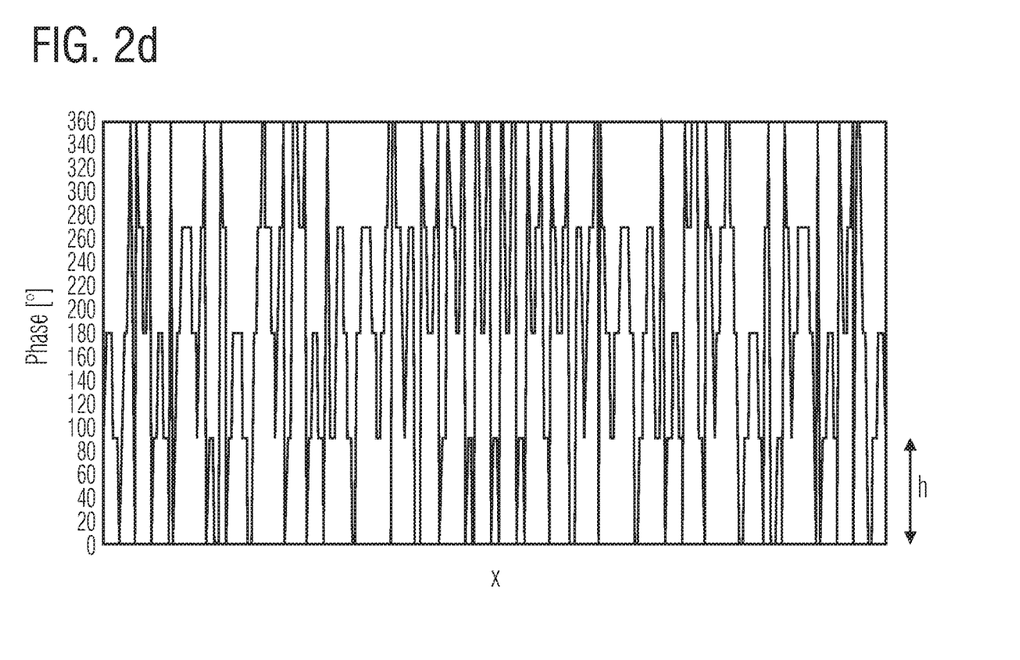
FIG. 2d is a cross-sectional view of the mixing grating illustrated in FIG. 2c along the x-direction in order to illustrate the phase characteristic.

An example embodiment of a mixing grating MG, which is arranged on the basis of the above considerations and which simultaneously has the required phase-shifting effects of the recombination element and the focusing effect of the focusing element, is schematically illustrated, in a plan view, in FIG. 2c. The illustrated mixing grating MG is arranged as a multi-step—e.g., a four-step—transmission phase grating, and the four grating regions, indicated in different forms in FIG. 2c, have different phase-shifting effects on the partial bundles of rays passing therethrough.

FIG. 2d is a cross-sectional view through the mixing grating of FIG. 3c along the indicated x-direction. Clearly indicated are the four provided phase steps and the phase characteristic of mixing grating MG provided along the x-direction. In addition to first grating regions having a step height h, there are additional grating regions which have step heights 2h, 3h, and 4h.

In the case of an n-step transmission phase grating, the following relationship generally applies to step height h:

$$h = \lambda/(n \cdot (n1 - n2)) \quad \text{(Eq. 6)}$$

in which h represents the step height, $\lambda$ represents the wavelength of the light, n:=2, 3, 4, . . . , n1 represents the refractive index of the grating bars, and n2 represents the refractive index of the grating gaps.

As an alternative to the arrangement as a transmission phase grating, it would also be possible to arrange the mixing grating as a reflection phase grating. Highly reflective materials such as gold or aluminum, for instance, may be particularly suitable for this purpose. The following relationship applies for step height h of an n-step reflection phase grating:

$$h = \lambda/(2 \cdot n) \quad \text{(Eq. 7)}$$

in which h represents the step height, $\lambda$ represents the wavelength of the light, and n=: 2, 3, 4, . . . .

Moreover, it is also possible to arrange the mixing grating as a stepless grating or as a saw-toothed grating.

An optical position measuring device according to an example embodiment of the present invention, in which a diffractive mixing grating is used that has the optical functionalities described above, is illustrated in FIG. 3 in a schematic cross-sectional side view. This position measuring device is used for detecting the distance of two objects, which are connected to measuring reflector 110 and scanning unit 120 and are situated so as to be displaceable relative to each other along vertical measuring direction z.

Figure 3:
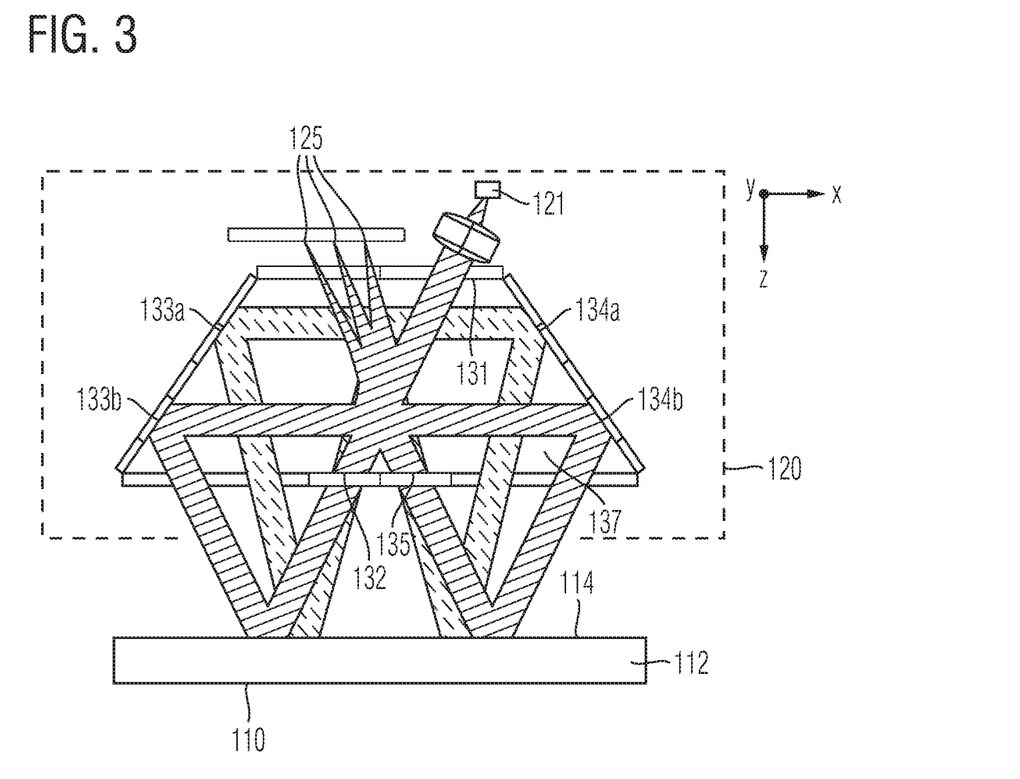
FIG. 3 is a schematic side view of a position measuring device according to an example embodiment of the present invention, arranged to detect a vertical relative movement.

In the illustrated exemplary embodiment, measuring reflector 110 includes a carrier substrate 112 on which a flat mirror 114 is situated. The reflective side of flat mirror 114 is oriented in the direction of scanning unit 120.

Situated on the side of scanning unit 120 is a light source 121, a detector system 125 having a plurality of optoelectronic detector elements, and a transparent carrier body 137, e.g., made of glass; alternatively, a suitable hollow body may also be used as a carrier body. Carrier body 137 according to the view in FIG. 3 has a cross-section in the form of a truncated pyramid. A number of optically functionally relevant elements are disposed on carrier body 137. Among these elements are a splitter element 132, which is situated on the surface of carrier body 137 facing measuring reflector 110, and a mixing grating 135, and four deflection elements 133a, 133b, 134a, 134b situated on side surfaces of the carrier body. A first deflection element 133a and a second deflection element 133b are situated on the left side surface of carrier body 137, and a third deflection element 134a and a fourth deflection element 134b are situated on the right side surface of carrier body 137. Splitter element 132, like mixing grating 135, is arranged as a transmission grating, and reflection gratings having suitably selected grating periods and whose reflective surfaces are oriented in the direction of the interior of carrier body 137, function as deflection elements 133a, 133b, 134a, 134b in this exemplary embodiment.

In the following text, the optical path, used for the signal generation, of the position measuring device will be described. As illustrated in FIG. 3, the bundle of rays emitted by light source 121 first passes through an optically neutral region 131 on the particular side of carrier body 137 that is facing light source 121. After passing through carrier body 137, the bundle of rays reaches splitter element 132 and is split into two partial bundles of rays, which—as illustrated in FIG. 3—continue propagating in the y-z plane in the direction of measuring reflector 110 and are incident thereon for the first time at first locations of incidence. At flat mirror 114 of measuring reflector 110, the partial bundles of rays are reflected back in the direction of scanning unit 120, i.e., in the direction of first and second deflection elements 133a, 133b. From these deflection elements 133a, 133b, the partial bundles of rays are deflected in the direction of third and fourth deflection elements 134a, 134b. Via third and fourth deflection elements 134a, 134b, another deflection of the partial bundles of rays takes place in the direction of flat mirror 114 of measuring reflector 110, on which the partial bundles of rays are incident a second time at second locations of incidence in each case. The second locations of incidence on flat mirror 114 may be offset in the indicated x-direction in relation to the first locations of incidence of the partial bundles of rays, as in the current exemplary embodiment. From second locations of incidence 114, a back reflection of the partial bundles of rays onto mixing grating 135 finally takes place, which is arranged as previously described and has the mentioned optical functionalities. Three pairs of superpositioned, interfering partial bundles of rays then propagate from mixing grating 135 through carrier body 137, exiting it through the optically neutral region 136 and, focused in each case on account of the optical effect of mixing grating 135, reach the three provided detector elements of detector system 125. In addition to the already mentioned optical functionalities of mixing grating 135 with regard to phase-shifting and focusing effects, mixing grating 135 also has a deflection effect perpendicular to the drawing plane in the present case, i.e., the three pairs of partial bundles of rays propagate in an inclined manner with respect to the x-z plane in the direction of detector elements 125. Via detector system 125, a plurality of phase-shifted, position-dependent incremental signals is detectable with regard to the relative offset of measuring reflector 110 and scanning unit 120 along measuring direction z.

Figure 4A:
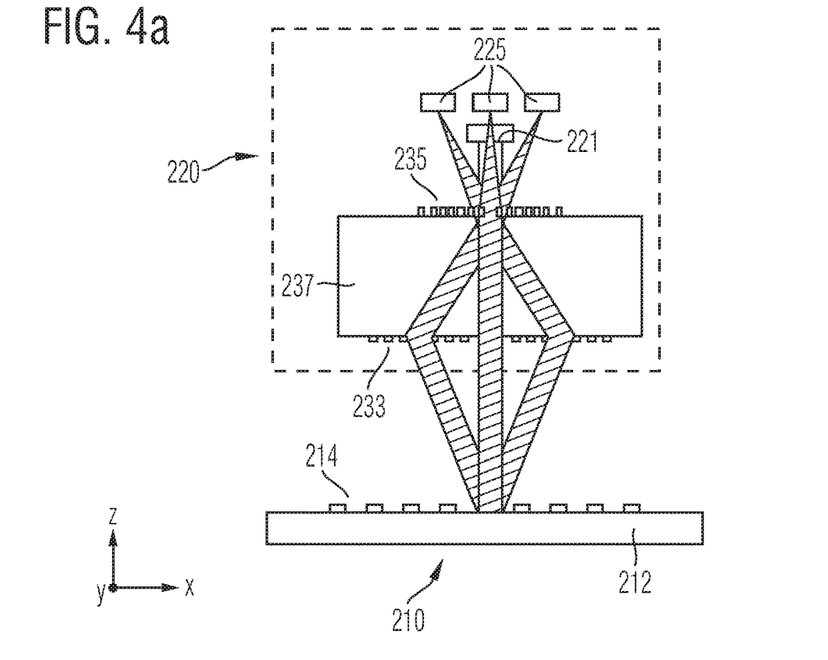
FIGS. 4a and 4b are schematic views, in different cross-sectional planes, of a position measuring device according to an example embodiment of the present invention, arranged to detect a lateral relative movement.
Figure 4B:
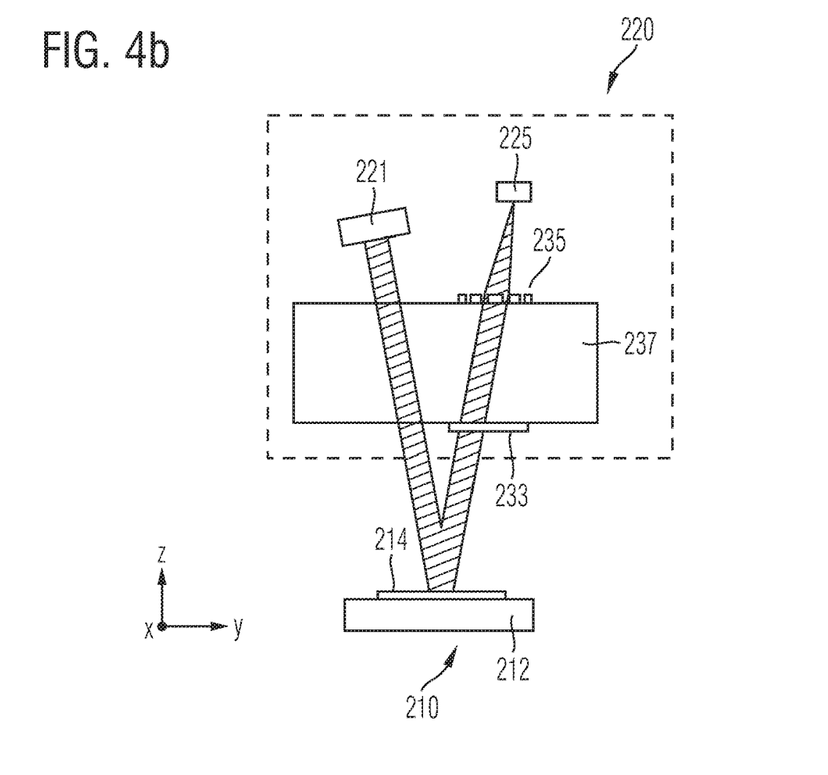

A position measuring device according to another example embodiment of the present invention is schematically illustrated in two different cross-sectional views in FIGS. 4a and 4b. This exemplary embodiment may be used for detecting the relative movement of a measuring standard 210 and a scanning unit 220 along measuring direction x, having, for example, a vertical orientation. Two objects, which are disposed so as to be moveable at least along measuring direction x, are connected to measuring standard 210 and scanning unit 220.

In this particular example, measuring standard 210 includes a reflection phase grating 214 which extends along measuring direction x and is situated on a carrier substrate 212. Reflection phase grating 214 includes rectangular graduation regions periodically disposed along measuring direction x, which have different phase-shifting effects on the bundles of rays incident thereon.

A light source 221, a plurality of optoelectronic detector elements 225, and a transparent scanning plate 237 having a plurality of optically functionally relevant elements disposed thereon are provided on the side of scanning unit 220. Among these are a plurality of scanning gratings 233 situated on the underside of scanning plate 237, as well as a mixing grating 235 situated on the topside. The underside describes the particular side of scanning plate 237 that is facing measuring standard 210; the topside of scanning plate 237 is consequently oriented so that it faces away from measuring standard 210. Scanning gratings 233 as well as mixing grating 235 are arranged as transmission phase gratings in each case.

The bundle of rays emitted by light source 221 passes through scanning plate 237 without any further deflection or splitting, and arrives on the topside of measuring standard 210 where the reflection phase grating is situated. There, the incident bundle of rays is split up into reflected partial bundles of rays of a $+/-1^{st}$ deflection order, which then propagate back in the direction of scanning unit 210 or scanning plate 237 again. As illustrated in FIG. 4b, the diffraction angle of back-reflected partial bundles of rays with respect to the normal of the measuring standard in the y-z plane is identical to the angle of incidence with respect to the measuring-standard normal in terms of its absolute amount; in this variant, measuring standard 210 is therefore illuminated under what is referred to as the Littrow angle. In scanning unit 220, the back-reflected partial bundles of rays then fall on scanning gratings 233 on the underside of scanning plate 237. Via these scanning gratings, the partial bundles of rays incident thereon are then reflected back to the optical axis, so that the partial bundles of rays come to the interfering superposition on the topside of scanning plate 237 in the region of mixing grating 235; in the process, the partial bundles of rays fall on mixing grating 235 under symmetrical angles. Via mixing grating 235, a pairwise superposition of certain diffraction orders then results again on the one hand, which then continue to propagate in the direction of downstream detector elements 225. In addition, as in the preceding exemplary embodiment, mixing grating 235 also assumes the focusing of the pairs of partial bundles of rays on individual detector elements 225.

As indicated above, because of the use of correspondingly arranged mixing grating 235, an only small spot diameter is able to be obtained on detector elements 225 despite large ray diameters on measuring standard 210. The large ray diameter on measuring standard 210 provides for an excellent robustness of the scanning with regard to contamination that could possibly arise on measuring standard 210. In addition, the use of smaller detector elements is possible, thereby ensuring an only slight signal noise in the generated incremental signals.

Figure 5A:
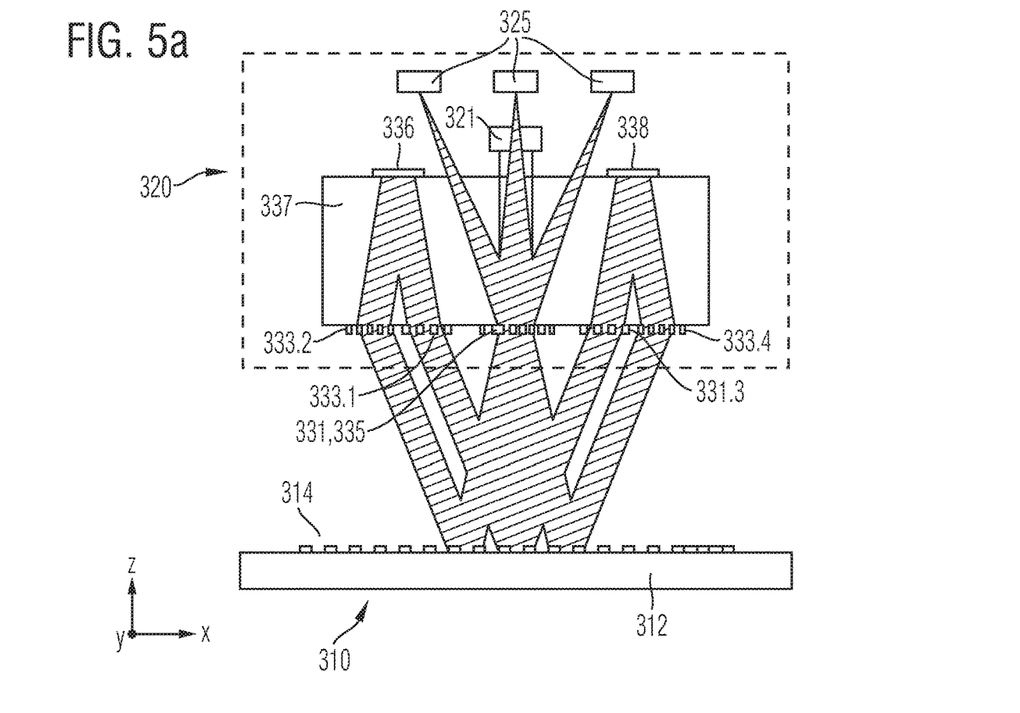
FIGS. 5a and 5b are schematic views, in different cross-sectional planes, of a position measuring device according to an example embodiment of the present invention, arranged to detect a lateral relative movement.
Figure 5B:
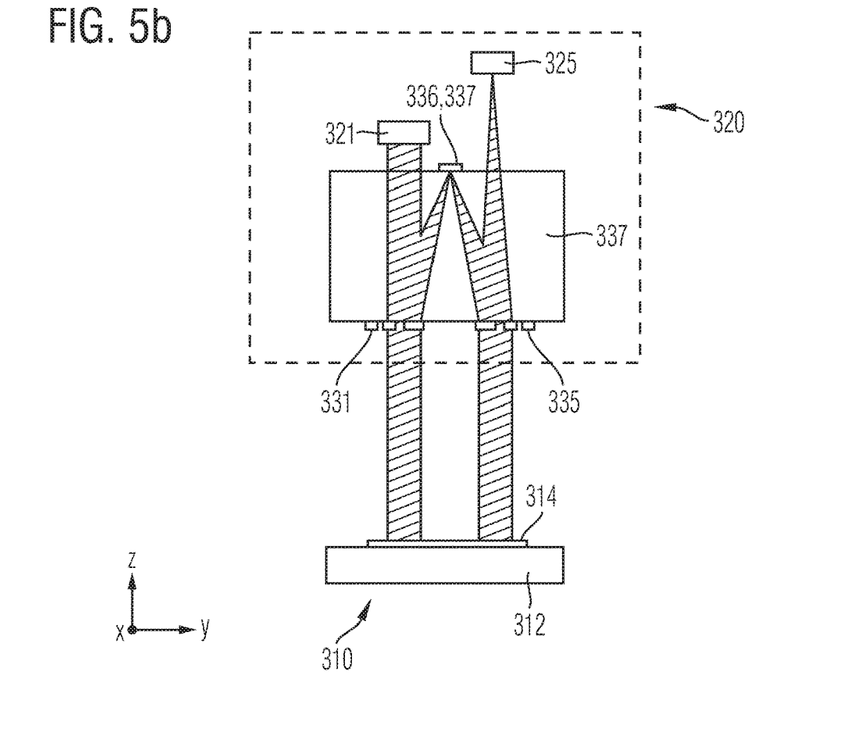

Referring to FIGS. 5a and 5b, a further exemplary embodiment of the position measuring device is described; similar to the preceding exemplary embodiment, it is shown in two different sectional views in FIGS. 5a and 5b.

As is the case in the previous exemplary embodiment, this exemplary embodiment, too, may be used for detecting the relative movement of two movable objects along a vertical measuring direction, which is once again denoted by x in FIGS. 5a and 5b.

Measuring standard 310 has a similar configuration as in the above-described exemplary embodiment, and once again includes a reflection phase grating 314 that extends along measuring direction x and is situated on a carrier substrate 312.

A light source 321, a plurality of detector elements 325, and a transparent scanning plate 337 having a plurality of optically functionally relevant elements disposed thereon are provided in scanning unit 320. Among these are several gratings disposed on the underside of scanning plate 237, i.e., a splitting grating 331, a plurality of scanning gratings 333.1 to 333.4, and a mixing grating 335; these gratings are arranged as transmission phase gratings in each case. Situated on the upper side of scanning plate 237 are two reflector elements 336, 338, whose reflective side is oriented in the direction of measuring standard 310 in each case.

The bundle of rays emitted by light source 321 first passes through scanning plate 337 until it reaches splitting grating 331 situated on the underside. There, a split into two partial bundles of rays takes place, which then propagate further in the direction of measuring standard 310. From reflection phase grating 314 of measuring standard 310, a reflection back in the direction of scanning unit 310 takes place. There, the partial bundles of rays then pass through scanning gratings 333.2, 333.4, via which a deflection in the y-direction as well as focusing on reflector elements 336, 338 on the upper side of the scanning plate results. From reflector elements 336, 338, the partial bundles of rays are reflected back to further scanning gratings 333.1, 333.3 on the underside of scanning plate 337. Via these scanning gratings 333.1, 333.3, the partial bundles of rays are then collimated and deflected anew, so that they are finally incident on measuring standard 310 one more time in a perpendicular manner in the x-z plane. Following the renewed back reflection, the partial bundles of rays reach mixing grating 335 on the underside of scanning plate 337, which exerts the optical effects described above on the partial bundles of rays. Then, pairs of interfering partial bundles of rays propagate in a focused manner to downstream detector elements 325 via which the phase-shifted incremental signals are generated.

In addition to the foregoing example embodiments, there are further arrangements and configurations that should be considered within the spirit and scope hereof.

For example, it is also possible to provide scanning optical paths in the position measuring device in which the partial bundles of rays to be superpositioned are not incident on the mixing grating under symmetrical angles of incidence, as was initially provided in FIGS. 1*a* and 1*b*. A mixing grating may be arranged as described for variants of such a type as well, which apart from adjusting defined phase relations for the different partial bundles of rays also ensures the focusing on the detector elements.

In addition, the position measuring device may be used not only for detecting displacement movements along linear measuring directions; position measuring devices that detect rotatory relative movements of two objects, etc., may be provided as well.

What is claimed is:

1. An optical position measuring device for interferential determination of a relative distance of two objects that are movable relative to each other along at least one measuring direction, a bundle of rays emitted by a light source being split up into at least two partial bundles of rays, which are subsequently incident on a grating or a plurality of gratings on separate optical paths and undergo distance-dependent phase shifts, comprising:
    at least three detector elements; and
    a mixing grating adapted to superimpose the partial bundle of rays so that at least three pairs of interfering partial beams of rays then propagate in different directions in space, the mixing grating adapted to focus each pair of interfering partial bundles of rays on a detector element, the detector elements adapted to detect at least three position-dependent, phase-shifted incremental signals.

2. The optical position measuring device according to claim 1, wherein two partial bundles of rays undergo at least a diffraction in the $0^{th}$, $+/-1^{st}$ and $+/-2^{nd}$ diffraction order and partial bundles of rays, interfering in a pairwise manner, of a $0^{th}/-2^{nd}$ diffraction order, a $+1^{st}/-1^{st}$ diffraction order, and a $0^{th}/+2^{nd}$ diffraction order propagate in a direction of the detector elements.

3. The optical position measuring device according to claim 1, wherein the mixing grating is arranged as a multi-step transmission phase grating.

4. The optical position measuring device according to claim 3, wherein the mixing grating is arranged as an n-step transmission phase grating, which has a phase function $\varphi(x, y)$ according to the following relationship:

$$\varphi(x, y) = \frac{2\pi}{n} \text{Round}\left( \frac{n * \text{atan2}(\text{Im}(T(x, y)), \text{Re}(T(x, y)))}{2\pi} \right),$$

wherein $\varphi(x, y)$ represents the phase function of the transmission phase grating, x and y represent spatial coordinates in a plane of the transmission phase grating, n represents a number of steps of the transmission phase grating, and $T(x, y)$ represents a transmission function of the mixing grating.

5. The optical position measuring device according to claim 3, wherein the mixing grating is arranged as an n-step transmission phase grating, in which the following relationship is satisfied:

$$h = \lambda/(n \cdot (n1 - n2)),$$

wherein h represents a step height of the transmission phase grating, $\lambda$ represents a wavelength of the light, n1 represents a refractive index of grating bars, and n2 represents a refractive index of grating gaps, and n:=1, 2, 3, 4 . . . .

6. The optical position measuring device according to claim 1, wherein a first one of the two objects is connected to a planar measuring reflector;
    wherein a second one of the two objects is connected to a scanning unit and is moveable relative to the measuring reflector along a measuring direction, the measuring direction having a perpendicular orientation with respect to the measuring reflector; and
    wherein the scanning unit includes:
        at least one light source;
        a plurality of detector elements;
        the mixing grating;
        a plurality of deflection elements, each arranged as a one-dimensional reflection grating; and
        at least one splitter element arranged as a one-dimensional transmission grating.

7. The optical position measuring device according to claim 6, wherein the scanning unit includes a transparent carrier body having a cross-section in the form of a truncated pyramid, the splitter element being arranged on a surface of the transparent carrier body facing the measuring reflector, at least four deflection elements being arranged on side surfaces of the transparent carrier body.

8. The optical position measuring device according to claim 6, wherein the splitter element is adapted to split the bundles of rays emitted by the light source into two partial bundles of rays that propagate in a direction of the measuring reflector;
    wherein from the measuring reflector, the partial bundles of rays are deflected back in a direction of first and second deflection elements in the scanning unit, where a deflection of the partial bundles of rays in a direction of third and fourth deflection elements results; and
    wherein the third and fourth deflection elements are adapted to deflect the partial bundles of rays to the measuring reflector, from where a reflection of the partial bundles of rays back in a direction of the mixing grating results in the scanning unit, at which a superposition of the partial bundles of rays occurs, and three pairs of interfering partial bundles of rays are then focused on three detector elements in three different directions in space.

9. The optical position measuring device according to claim 1, wherein a first one of the two objects is connected to a measuring standard;
   wherein a second one of the two objects is connected to a scanning unit and is movable along a measuring direction relative to the measuring standard, the measuring direction being oriented parallel to a measuring-standard plane; and
   wherein the scanning unit includes:
      at least one light source;
      a plurality of detector elements;
      the mixing grating; and
      a plurality of scanning gratings, each of which is arranged as a one-dimensional transmission grating.

10. The optical position measuring device according to claim 9, wherein the scanning unit includes a transparent scanning plate, the mixing grating and/or the scanning gratings being arranged on an upper side and/or an underside of the transparent scanning plate.

11. The optical position measuring device according to claim 10, wherein at least one reflector element is arranged on the upper side of the scanning plate, a reflective side of each reflector element being oriented in a direction of the measuring standard, the mixing grating and the scanning gratings being arranged on the underside of the transparent scanning grate.

* * * * *